United States Patent
Chen et al.

(10) Patent No.: US 8,184,735 B2
(45) Date of Patent: May 22, 2012

(54) SPHERE DECODING METHOD APPLIED TO MULTI-INPUT MULTI-OUTPUT (MIMO) CHANNEL

(75) Inventors: Yen-Chih Chen, Hsinchu (TW); Tsung-Chun Cheng, Taipei County (TW); Der-Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 347 days.

(21) Appl. No.: 12/562,305

(22) Filed: Sep. 18, 2009

(65) Prior Publication Data

US 2010/0074375 A1    Mar. 25, 2010

(30) Foreign Application Priority Data

Sep. 19, 2008   (TW) ................... 97136180 A (51) Int. Cl.
    *H04L 7/02*   (2006.01)
(52) U.S. Cl. ...................................... 375/267
(58) Field of Classification Search ............. 375/267, 375/262, 340, 341, 316; 455/214, 337; 370/203, 370/330, 338
    See application file for complete search history.

(56) References Cited

U.S. PATENT DOCUMENTS

| | | | |
|---|---|---|---|
| 2005/0135498 A1 | 6/2005 | Yee | |
| 2006/0188044 A1 | 8/2006 | Wang et al. | |
| 2009/0232241 A1* | 9/2009 | Shabany et al. | 375/262 |
| 2010/0054365 A1* | 3/2010 | Cheng et al. | 375/320 |

OTHER PUBLICATIONS

Office Action issued in on Dec. 15, 2011, in related U.S. Appl. No. 12/562,351.

* cited by examiner

*Primary Examiner* — Khai Tran
(74) *Attorney, Agent, or Firm* — Thomas, Kayden, Horstemeyer & Risley, LLP (57) ABSTRACT

A sphere decoding method applied to a MIMO channel is provided. Multiple constellation points of an $n^{th}$ detection layer corresponding to the MIMO channel matrix are enumerated based on an enumeration rule, and at least one $n^{th}$ sub-set of the nth detection layer is defined. The constellation point with the least PED is obtained as a preferred point. Another constellation, not in the $n^{th}$ sub-set, of the nth detection layer is selected to substitute for the preferred point as one of the $n^{th}$ sub-set. If other preferred points are needed to be obtained, the $n^{th}$ sub-set is updated repeatedly according to the least PED. An optimal solution is determined according to $K_n$ preferred points of the $n^{th}$ detection layer.

17 Claims, 9 Drawing Sheets

SPHERE DECODING METHOD APPLIED TO MULTI-INPUT MULTI-OUTPUT (MIMO) CHANNEL

This application claims the benefit of Taiwan application Serial No. 97136180, filed Sep. 19, 2009, the subject matter of which is incorporated herein by reference.

BACKGROUND OF THE INVENTION

1. Field of the Invention

The invention relates in general to a sphere decoding method applied to a multi-input multi-output (MIMO) channel, and more particularly to a sphere decoding method applied to a MIMO channel capable of reducing system complexity.

2. Description of the Related Art

With the development of the wireless communication technology, standards of wireless local area network have evolved from 802.11a/b/g standard for single-input single-output (SISO) mode into 802.11n standard for multi-input multi-output (MIMO) mode, so as to meet the requirement of high speed data transmission. The MIMO technology utilizes multiple transmission antennas and reception antennas for respectively transmitting and receiving signals. As compared with the conventional SISO system, the MIMO system can provide multiple parallel data streams on the same frequency band at the same time, thereby increasing the data transmission amount by multiples.

The MIMO system has to effectively use an equivalent channel with orthogonal characteristics in space to transmit the multiple parallel data streams on the same frequency band. However, the equivalent channel with orthogonal characteristics in space decays to different extents depending on geometric arrangement and element characteristic of the transmission antennas and reception antennas and geometric and statistic features of the transmission paths. Therefore, signal detection becomes an important issue in MIMO system design. In general, the complexity of a signal detection system is raised for reducing the error rate of signal reception.

In present signal detection methods, the maximum likelihood (ML) rule can provide the optimal receiving performance, but increase the complexity of the signal detection system to a too-high extent, causing difficulties in hardware implementation. Therefore, a sphere decoding method is developed to simultaneously have a receiving performance close to that of the maximum likelihood rule and suitable system complexity. In the sphere decoding method, a K-Best breadth-first sphere decoding method is very suitable for hardware implementation because of its fixed throughput and fixed complexity.

The receiving performance of the K-Best sphere decoding method is determined by a value of K. If the value of K gets larger, the signal receiving performance becomes higher, but the system complexity is increased. If the value of K gets smaller, the system complexity is decreased, but the signal receiving performance becomes lower. Therefore, in the K-Best sphere decoding method, the value of K has to be determined to meet the requirements of system complexity and receiving performance. In addition, in the K-Best sphere decoding method, each detection layer includes M constellation points, wherein M is a positive integer. In the K-best sphere decoding method, each detection layer receives K preferred points from the previous detection layer, and K×M partial Euclidean distances have to be calculated and then sorted to obtain K preferred points of the present detection layer to transfer to the next detection layer.

If T signals are transmitted via the MIMO channel, the K-Best sphere decoding method corresponds to T detection layers in the complex domain, wherein T is a positive integer. Thus, the K-best sphere decoding method has to calculate the partial Euclidean distances $M+(T-2)\times K\times M+K$ times and perform a sorting operation once every detection layer. However, as for a high-order MIMO system, when the MIMO channel decays to a more serious extent or orthogonal characteristics are insufficient, the value of K has to be increased to enhance the receiving performance of the system. Consequently, the system complexity greatly increases by a multiple of $(T-2)\times M$, thereby enlarging the area of the chip processor, increasing power consumption and reducing data processing amount.

SUMMARY OF THE INVENTION

The invention is directed to a sphere decoding method applied to a multi-input multi-output (MIMO) channel. Based on Schnorr & Euchner (SE) enumeration rule, the corresponding preferred points can be obtained from a part of constellation points of each detection layers by way of linking-list schemes, thereby reducing the detection complexity of the sphere decoding method.

According to an aspect of the present invention, a sphere decoding method applied to a MIMO channel is provided. The method includes a number of steps. Multiple constellation points of an $n^{th}$ detection layer corresponding to a MIMO channel matrix are enumerated based on an enumeration rule, and at least one $n^{th}$ sub-set of the $n^{th}$ detection layer is defined. From the $n^{th}$ sub-set, a constellation point with the least partial Euclidean distance (PED) is selected as a preferred point. Another constellation point of the $n^{th}$ detection layer, not included in the $n^{th}$ sub-set, is selected to substitute for the preferred point as one element of the $n^{th}$ sub-set. If other preferred points are needed to be obtained, the $n^{th}$ sub-set is updated repeatedly according to the least PED. An optimal solution is determined according to $K_n$ preferred points of the $n^{th}$ detection layer, wherein $K_n$ is a positive integer.

The invention will become apparent from the following detailed description of the preferred but non-limiting embodiments. The following description is made with reference to the accompanying drawings.

DETAILED DESCRIPTION OF THE INVENTION

The invention is directed to a sphere decoding method applied to a MIMO channel. Based on the SE enumeration rule, K preferred points can be obtained respectively in the complex domain and the real domain from a part of constellation points in each detection layer by way of linking-list schemes, thereby reducing the detection complexity of the sphere decoding method.

Figure 1:
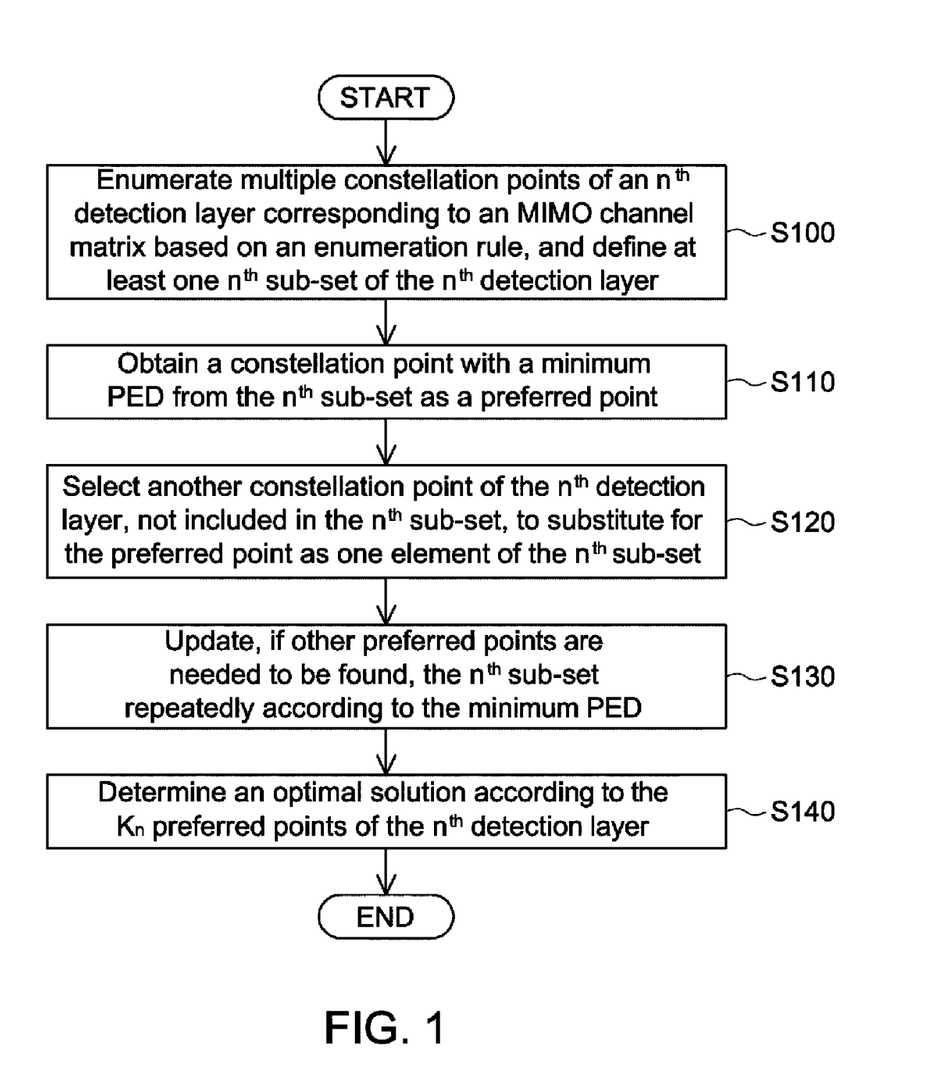
FIG. 1 shows a flowchart of a sphere decoding method applied to a MIMO channel according to a preferred embodiment of the invention.

FIG. 1 is a flowchart of a sphere decoding method applied to a MIMO channel according to a preferred embodiment of the invention. Referring to FIG. 1, in step S100, multiple constellation points of an $n^{th}$ detection layer corresponding to a MIMO channel matrix are enumerated based on an enumeration rule, and at least one $n^{th}$ sub-set of the $n^{th}$ detection layer is defined. The enumeration rule can be an SE enumeration rule for instance. In step S110, a constellation point with the least partial Euclidean distance (PED) is obtained from the $n^{th}$ sub-set as a preferred point. In step S120, another constellation point of the $n^{th}$ detection layer, not included in the $n^{th}$ sub-set, is selected to substitute for the preferred point as one element of the $n^{th}$ sub-set. In step S130, if other preferred points are needed to be obtained, the $n^{th}$ sub-set is updated repeatedly according to the least PED. In step S140, an optimal solution is determined according to $K_n$ preferred points of the $n^{th}$ detection layer, wherein $K_n$ is a positive integer. $K_n$, the number of preferred points of the $n^{th}$ detection layer, can be determined by the characteristic of the MIMO channel matrix.

Embodiments of the sphere decoding method, which are respectively applied in the complex domain and the real domain, are taken as examples for elaboration as follows.

Embodiment One

The sphere decoding method applied to a MIMO channel of this embodiment is applied in the complex domain, which includes the following steps of: a. receiving T signals transmitted via a MIMO channel, wherein T is a positive integer, and the MIMO channel is characterized by a channel matrix; b. generating a triangle matrix corresponding to the channel matrix, wherein the triangle matrix corresponds to a first detection layer to a $T^{th}$ detection layer, wherein each detection layer includes M constellation points, M being a positive integer; c. obtaining a first zero-forcing soft-output solution corresponding to the first detection layer, obtaining a first set based on the SE enumeration rule, wherein the first set contains multiple first constellation points of the first detection layer, selecting an $i^{th}$ preferred point P(1) from the first set, wherein i is a positive integer between 1 and K, and collecting another first constellation point, not included in the first set, into the first set according to the $i^{th}$ preferred point P(1); d. obtaining K $n^{th}$ zero-forcing soft-output solutions corresponding to an $n^{th}$ detection layer according to K preferred points P(n−1) of an (n−1)$^{th}$ detection layer, obtaining K $n^{th}$ sub-sets respectively corresponding to the K $n^{th}$ zero-forcing soft-output solutions based on the SE enumeration rule, wherein the K $n^{th}$ sub-sets each contain multiple $n^{th}$ constellation points of the $n^{th}$ detection layer, obtaining an $n^{th}$ set according to the K $n^{th}$ sub-sets; updating at least one of the K sub-sets according to an $i^{th}$ preferred point P(n), and collecting an $n^{th}$ constellation point of the K $n^{th}$ sub-sets into the $n^{th}$ set, wherein n is a positive integer from 2 to (T−1); and e. obtaining K $T^{th}$ zero-forcing soft-output solutions corresponding to a $T^{th}$ detection layer, obtaining K preferred points P(T) of the $T^{th}$ detection layer based on the SE enumeration rule, and obtaining an optimal solution corresponding to the T signals according to one of the K preferred points P(T) corresponding to the least PED.

Figure 2:
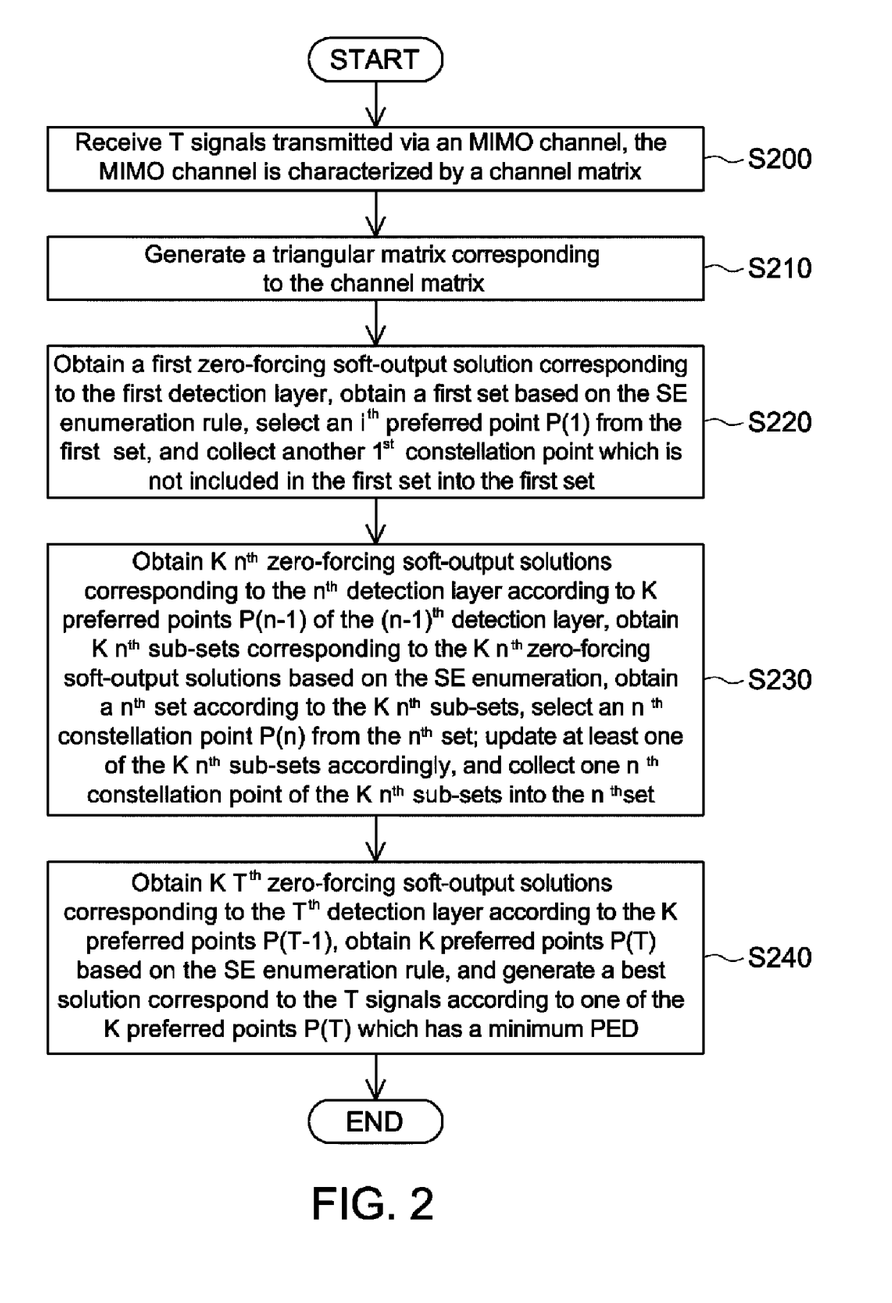
FIG. 2 shows a flowchart of a sphere decoding method applied to a MIMO channel according to a first embodiment of the invention.

Further detailed description is provided below. FIG. 2 is a flowchart of a sphere decoding method applied to a MIMO channel according to a first embodiment of the invention. Referring to FIG. 2, first, in step S200, T signals transmitted via the MIMO channel are received. The MIMO channel is characterized by a channel matrix. Preferably, R' reception antennas are used to receive T signals transmitted by T transmitter antennas via the MIMO channel, wherein R' is a positive integer. The channel matrix is an R'×T channel matrix H. The MIMO system represented in the time domain or the frequency domain can be defined as follows:

$$r = Hx + n \quad (1)$$

wherein, the R'×1 matrix r represents the signals received by the R' reception antennas, the T×1 matrix x represents the signals transmitted by T transmission antennas, and the R'×1 matrix n represents noise.

Next, in step S210, a Q-R decomposition is performed on the channel matrix H to generate a triangular matrix, and the triangular matrix corresponds to a first detection layer to a $T^{th}$ detection layer. Preferably, the first to the $T^{th}$ detection layers correspond to rows of the triangular matrix having the most "0" elements, the secondly most "0" elements, . . . , the least "0" elements. By performing the above Q-R decomposition, it can be obtained:

$$H = QR$$

wherein, Q is an R'×T matrix, and R is a T×T triangular matrix. The triangular matrix R is an upper triangular matrix for instance, but is not limited thereto. After the step S210, according to equality formula (1) another equality formula of the MIMO system can be obtained as follows:

$$y = Q^H r = Rx + Q^H n \quad (2)$$

wherein, the matrix product of $Q^H$ and Q is a unit matrix I. If the noise item $Q^H n$ in the equality formula (2) is omitted, and the triangular matrix R is an upper triangular matrix, the equality formula (2) can be expanded in a matrix form as follows:

$$\begin{bmatrix} y_1 \\ y_2 \\ y_3 \\ \vdots \\ y_T \end{bmatrix} = \begin{bmatrix} r_{11} & r_{12} & r_{13} & \cdots & r_{1T} \\ 0 & r_{22} & r_{23} & \ddots & r_{2T} \\ 0 & 0 & r_{33} & \ddots & r_{3T} \\ \vdots & \vdots & \ddots & \ddots & \vdots \\ 0 & 0 & 0 & 0 & r_{TT} \end{bmatrix} \begin{bmatrix} x_1 \\ x_2 \\ x_3 \\ \vdots \\ x_T \end{bmatrix} \quad (3)$$

wherein, $y_p$ and $y_{pq}$ are given, p is a positive integer from 1 to T, and q is a positive integer from 1 to T. This embodiment obtains the optimal solution of $x_1$ to $x_T$ by using the values of given $y_p$ and $y_{pq}$.

In the equality formula (3), the equation $y_T = r_{TT}x_T$ corresponding to $x_T$ is defined as the first detection layer; the equations corresponding to $x_{T-1}, \ldots, x_2$ are defined as the second to $(T-1)^{th}$ detection layers; and the equation $y_1 = r_{1T}x_T + \ldots + r_{11}x_1$ corresponding to $x_1$ is defined as the $T^{th}$ detection layer. Each detection layer includes M constellation points, wherein M is a positive integer.

Figure 3:
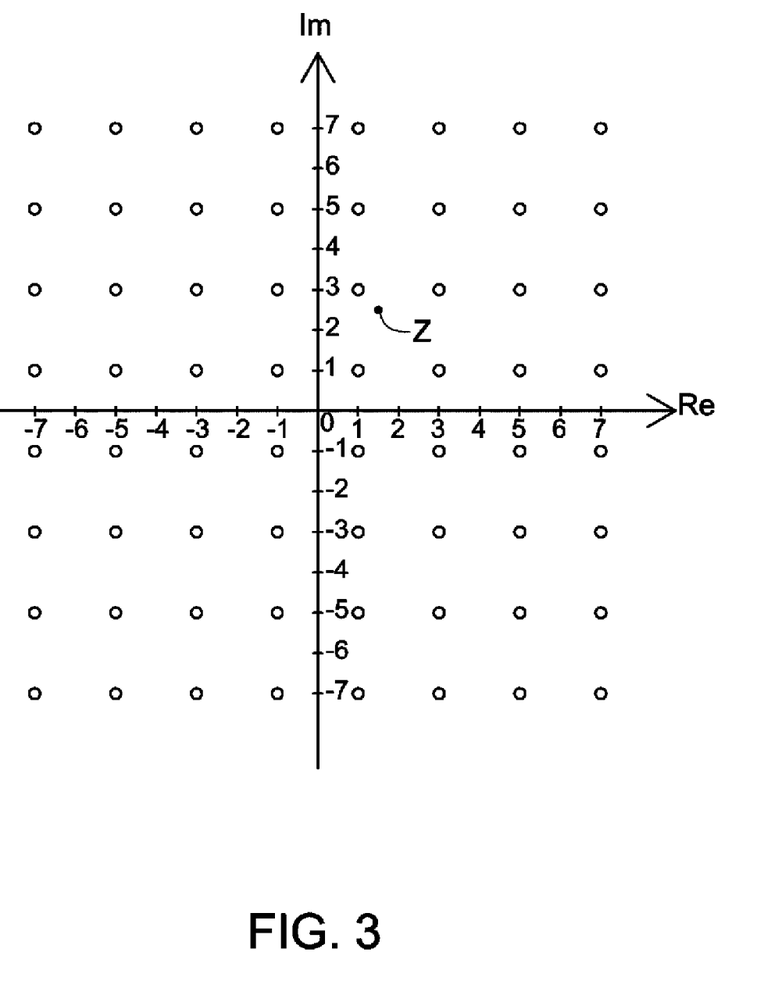
FIG. 3 shows a schematic illustration of constellation points of a detection layer of the sphere decoding method.

FIG. 3 shows a schematic illustration of constellation points of a detection layer of the sphere decoding method. Referring to FIG. 3, each detection layer is exemplified to include 64 constellation points (symbolized by hollow dots) for illustration, but is not limited thereto. The K-Best sphere decoding method generates K preferred points corresponding to the $n^{th}$ detection layer, wherein K is less than M. The embodiment of this invention, however, is not limited thereto the exemplary example, in which the sphere decoding method generates K preferred points for each detection layer. In practice, the sphere decoding method can generate different numbers of preferred points for each detection layer. The number $K_n$ of preferred number of the $n^{th}$ detection layer is determined by the characteristic the MIMO channel matrix in substantial.

Then, in step S220, a first zero-forcing soft-output solution corresponding to the value $x_T$ of the first detection layer is obtained. Then, a first set $\Omega_1$ is obtained based on the SE enumeration rule, wherein the first set $\Omega_1$ contains multiple first constellation points of the first detection layer. Next, according to an $i^{th}$ preferred point P(1), another first constellation point which is not included in the first set is collected into the first set $\Omega_1$, wherein i is a positive integer from 1 to K. Corresponding to the first detection layer, the equation $y_T = r_{TT}x_T$ is solved to obtain the first zero-forcing soft-output solution $y_T/r_{TT}$ of $x_T$. The first zero-forcing soft-output solution of $x_T$, could be represented by floating-point numbers for its real part and imaginary part, such as the point Z(1.4, 2.3) in FIG. 3. In the following steps, K constellation points near the point Z will be obtained to be K preferred points.

The above SE enumeration rule subsequently enumerates integers near a target value in an ascending order according to a one-dimensional distance (a distance along the real axis or the imaginary axis) from the target value. Example is made by taking the real part of Z point, i.e., 1.4, for illustration. Based on the SE enumeration rule, the sequentially enumerated are real parts 1, 3, −1, 5, −3, 7, −5, . . . , which are integers and have near to far distances from the target value along the real axis. Because the SE enumeration rule can be implemented with simple algorithm, the system computational complexity can be reduced efficiently. In the coordinates of FIG. 3, the real axis and imaginary axis represent amplitudes of two orthogonal carriers modulated by quadrature amplitude modulation (QAM) of the MIMO system.

The step S220 substantially enumerates multiple constellation points of the first detection layer based on the SE enumeration rule, and defines a first set of the first detection layer. A candidate range of the constellation points of the first set is determined from a real axis candidate range $\sqrt{M}$ and an imaginary axis candidate range $\sqrt{M}$. In the step S220, corresponding to the first zero-forcing soft-output solution of $x_T$, $\sqrt{M}$ real-part candidate values and $\sqrt{M}$ imaginary-part candidate values are sequentially obtained based on the SE enumeration rule. Next, the $\sqrt{M}$ imaginary-part candidate values are set to be $\sqrt{M}$ first candidate values while $\sqrt{M}$ real-part candidate values are set to be $\sqrt{M}$ second candidate values, or the $\sqrt{M}$ real-part candidate values are set to be $\sqrt{M}$ first candidate values while $\sqrt{M}$ imaginary-part candidate values are set to be $\sqrt{M}$ second candidate values, which both can be regarded as a practicable embodiment. In this example, based on the SE enumeration rule, $\sqrt{M}$ first candidate values are enumerated as $1^{st}$-$1^{st}$ to $\sqrt{M}^{th}$-$1^{st}$ candidate values. Next, multiple first constellation points, which correspond to the $1^{st}$-$1^{st}$ candidate and the $\sqrt{M}$ second candidate values, are selected as the first set $\Omega_1$. After that, let the values of the first constellation points of the first set $\Omega_1$ be $x_T$ for respectively substituting for $r_{TT}x_T$, and the obtained results are defined to be $y'_T$. Consequently, the PED corresponding to each first constellation point corresponds to a square root of the corresponding $(y'_T - y_T)^2$.

Let the value of i be 1. An $i^{th}$ preferred point P(1) is selected from the first set $\Omega_1$, wherein the PED corresponding to the $i^{th}$ preferred point P(1) is less than the PED corresponding to any of other first constellation points of the first set $\Omega_1$. Next, one first constellation point, which corresponds to a subsequent first candidate value of a corresponding first candidate value of the $i^{th}$ preferred point P(1) and a corresponding second candidate value of the $i^{th}$ preferred point P(1), is collected into the first set $\Omega_1$. When i is less than or equal to (K−1), the value of i is added by 1 and the above steps are repeated. Consequently, the first to $K^{th}$ preferred points P(1) can be generated by way of linking-list schemes. In this way, the K preferred points P(1) of the first detection layer can be obtained by using only ($\sqrt{M}$+K−1) times of PED calculation without having to calculate the PEDs up to M times, thereby reducing the system complexity.

Afterwards, this embodiment enters step S230. As for second to $(T-1)^{th}$ detection layers, K $n^{th}$ zero-forcing soft-output solutions of $x_{T-n+1}$ corresponding to the $n^{th}$ detection layer are obtained according to K preferred points P(n−1) of an $(n−1)^{th}$ detection layer; and K $n^{th}$ sub-sets $\omega_{n,1}$~$\omega_{n,K}$ corresponding to the K $n^{th}$ zero-forcing soft-output solutions are obtained based on the SE enumeration rule, wherein each K $n^{th}$ sub-sets $\omega_{n,1}$~$\omega_{n,K}$ contains respective multiple $n^{th}$ constellation points of the $n^{th}$ detection layer. Then, an $n^{th}$ set $\Omega_n$ is obtained according to the K $n^{th}$ sub-sets $\omega_{n,1}$~$\omega_{n,K}$; an $i^{th}$ preferred point P(n) is selected from the $n^{th}$ set $\Omega_n$; at least one of the K $n^{th}$ sub-sets $\omega_{n,1}$~$\omega_{n,K}$ is modified according to the $i^{th}$ preferred point P(n); and one $n^{th}$ constellation point of the K $n^{th}$ sub-sets $\omega_{n,1}$~$\omega_{n,K}$ is collected into the $n^{th}$ set $\Omega_n$, wherein n is a positive integer from 2 to (T−1).

In step S230, the second detection layer is first processed, and at this time n equals to 2. When n equals to 2, $y_{T-1} = r_{(T-1)T}x_T + r_{(T-1)(T-1)}x_{T-1}$ is solved to obtain K second zero-forcing soft-output solutions of $x_{T-1}$ corresponding to the second detection layer according to K preferred points P(1) of the first detection layer. Next, $\sqrt{M}$ first candidate values and $\sqrt{M}$ second candidate values for each of the K second zero-forcing soft-output solutions of $x_{T-1}$ are obtained based on the SE enumeration rule. Also, multiple second constellation points, which correspond to the K $1^{st}$-$1^{st}$ candidate values and multiple second candidate values, are selected as K second sub-sets $\omega_{2,1}$~$\omega_{2,K}$, respectively. Then, at least one respective second constellation points with a less PED are obtained from the $\sqrt{M}$ second constellation points of every second sub-sets $\omega_{2,1}$~$\omega_{2,K}$, so as to obtain the second set $\Omega_2$. Next, the values of the second constellation points of the second set $\Omega_2$ are set to be $x_{T-1}$, the second constellation point and the corresponding preferred points P(1) are substituted into $r_{(T-1)T}x_T + r_{(T-1)(T-1)}x_{T-1}$, and the obtained results defined are defined to be $y'_{T-1}$. Therefore, the PED corresponding to each second constellation point corresponds to a square root of the corresponding $(y'_T - y_T)^2 + (y'_{T-1} - y_{T-1})^2$.

Let the value of i be 1. An $i^{th}$ preferred point P(2) is selected from the second set $\Omega_2$, wherein the PED corresponding to the $i^{th}$ preferred point P(2) is less than the PED corresponding to any of other second constellation points of the second set $\Omega_2$. Next, according to the corresponding second set $\Omega_2$ of the $i^{th}$ preferred point P(2), one second constellation point, which corresponds to a subsequent first candidate value of a corresponding first candidate value of the $i^{th}$ preferred point P(2) and a corresponding second candidate value of the $i^{th}$ preferred point P(2), is collected into the corresponding second sub-set of the $i^{th}$ preferred point P(2). After that, those with less PEDs are obtained from the second constellation points of the second sub-set, and collected into the second set $\Omega_2$. When i is less than or equal to (K−1), the value of i is added by 1 and the above steps are repeated. Consequently, the first to $K^{th}$ preferred points P(2) can be generated by way of linking-list schemes.

If n is less than or equal to (T−2), the value of n is added by 1. Then, the third to $(T-1)^{th}$ detection layers are processed, and at this time n equals to 3 to (T−1), respectively. First, according to K preferred points P(n−1) of the $(n-1)^{th}$ detection layer, $y_{T-n+1} = r_{(T-n+1)T}x_T + \ldots + r_{(T-n+1)(T-n+1)}x_{T-n+1}$ is solved to obtain K $n^{th}$ zero-forcing soft-output solutions of $x_{T-n+1}$ corresponding to the $n^{th}$ detection layer. Next, $\sqrt{M}$ first candidate values and $\sqrt{M}$ second candidate values for each $n^{th}$ zero-forcing soft-output solutions of $x_{T-n+1}$ are obtained based on the SE enumeration rule. Also, multiple $n^{th}$ constellation points, which correspond to the K $1^{st}$-$1^{st}$ candidate values and multiple second candidate values, are selected as K second sub-sets $\omega_{2,1} \sim \omega_{2,K}$, respectively. Then, at least one respective $n^{th}$ constellation points with a less PED are obtained from the $\sqrt{M}$ $n^{th}$ constellation points of every $n^{th}$ sub-sets $\omega_{2,1} \sim \omega_{2,K}$, so as to obtain the $n^{th}$ set $\Omega_n$. In this way, each corresponding PEDs of the $n^{th}$ constellation points corresponds to a square root of the corresponding $(y'_T - y_T)^2 + (y'_{T-1} - y_{T-1})^2 + \ldots + (y'_{T-n+1} - y_{T-n+1})^2$.

Let the value of i be 1. An $i^{th}$ preferred point P(n) is selected from the $n^{th}$ set $\Omega_n$, wherein the PED corresponding to the $i^{th}$ preferred point P(n) is less than the PED corresponding to any of other $n^{th}$ constellation points of the $n^{th}$ set $\Omega_n$. Next, according to the corresponding $n^{th}$ sub-set $\Omega_n$ of the $i^{th}$ preferred point P(n), one $n^{th}$ constellation point, which corresponds to a subsequent first candidate value of a corresponding first candidate value of the $i^{th}$ preferred point P(n) and a corresponding second candidate value of the $i^{th}$ preferred point P(n), is collected into the corresponding $n^{th}$ sub-set of the $i^{th}$ preferred point P(n). After that, those with less PEDs are obtained from the $n^{th}$ constellation points of the $n^{th}$ sub-set, and collected into the $n^{th}$ set $\Omega_n$. When i is less than or equal to (K−1), the value of i is added by 1 and the above steps are repeated. Consequently, the first to $K^{th}$ preferred points P(n) can be generated by way of linking-list schemes. In this way, the K preferred points P(n) of the $n^{th}$ detection layer can be obtained by using only $(K\sqrt{M}+K-1)$ times of PED calculation without having to calculate the PED up to K×M times, thereby reducing the system complexity.

After that, in step S240, according to K preferred points P(T−1) oaf $(T-1)^{th}$ detection layer, $y_1 = r_{1T}x_T + \ldots + r_{11}x_1$ is solved to obtain K $T^{th}$ zero-forcing soft-output solutions of $x_1$ corresponding to the $T^{th}$ detection layer. Next, K preferred points P(T) of the $T^{th}$ detection layer are obtained based on the SE enumeration rule. Also, according to one of the $K_T$ preferred points P(T) which corresponds to the least PED, an optimal solution corresponding to the T signals is determined. In the K preferred points P(T), each corresponding PED corresponds to a square root of the corresponding $(y'_T - y_T)^2 + (y'_{T-1} - y_{T-1})^2 + \ldots + (y'_1 - y_1)^2$. In this way, the K preferred points P(T) of the $T^{th}$ detection layer can be obtained by using K times of PED calculation without having to calculate the PED up to M times, thereby reducing the system complexity.

Figure 4:
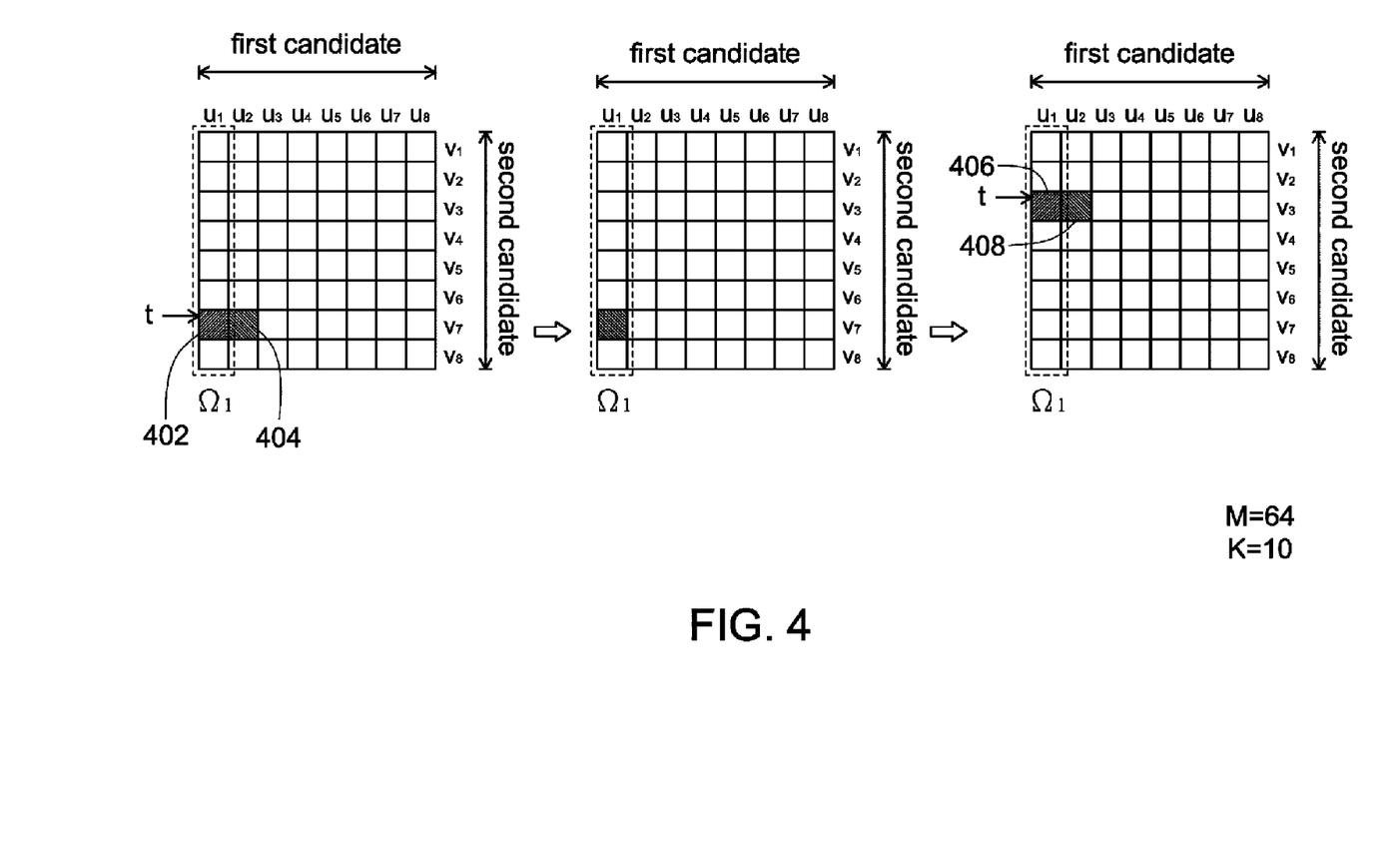
FIG. 4 shows a schematic illustration of an example of the first candidate values and second candidate values corresponding to the first detection layer according to the first embodiment of the invention.

Illustration will be made without any limitative purpose according to the example, in which M equals to 64, K equals to 10, imaginary-part candidate values of each zero-forcing soft-output solution are first candidate values, and real-part candidate values of each zero-forcing soft-output solution are second candidate values. FIG. 4 is a schematic illustration of an example of the first candidate values and second candidate values corresponding to the first detection layer according to the first embodiment of the invention. In FIG. 4, 8 first candidate values $u_1$ to $u_8$ and 8 second candidate values $v_1$ to $v_8$ for the first zero-forcing soft-output solution of $x_T$ are obtained based on the SE enumeration rule. In this example, 8 first constellation points, which correspond to the $1^{st}$-$1^{st}$ candidate $u_1$ and $\sqrt{M}$ second candidate values $v_1$ to $v_8$, are selected as the first set $\Omega_1$. Assume that the first zero-forcing soft-output solution of $x_T$ is the point Z(1.4, 2.3) shown in FIG. 3. The 8 first candidate values are 8 imaginary parts, such as 3, 1, 5, −1, 7, −3, 9, and −5, respectively, which are closet to the imaginary part 2.3 of the point Z along the imaginary axis. The 8 second candidate values are 8 real parts, such as 1, 3, −1, 5, −3, 7, −5, and 9, which are closet to the real part 1.4 of the point Z along the real axis.

From the 8 first constellation points of the first set $\Omega_1$, the selected is a first preferred point P(1). In selecting the first preferred point P(1), a first constellation with the least PED is obtained and served as the first preferred point P(1). Consequently, the PED corresponding to the $i^{th}$ preferred point P(1) is less than the PED corresponding to any of other first constellation points of the first set $\Omega_1$. That is, let $x_T$ be the values of the 8 constellation points for respectively substituting into $r_{TT}x_T$, and the obtained results are defined to be $y'_T$. After that, one of the 8 first constellation points which corresponds to the least PED is selected as the first preferred point P(1). The first preferred point P(1) is exemplified to be a corresponding first constellation point of a location 402, its corresponding first candidate value is $u_1$, and its corresponding second candidate value is $v_7$. Next, a pointer t is used to point to the second candidate value $v_7$. Then, one first constellation point, which corresponds to the second candidate value $v_7$ and a subsequent first candidate value $u_2$ of the first candidate value $u_1$, is collected into the first set $\Omega_1$, which can be referred to as the corresponding first constellation of a location 404.

Moreover, from the 8 first constellation points of the first set $\Omega_1$, the selected is a second preferred point P(1), wherein the PED corresponding to the second preferred point P(1) is less than the PED corresponding to any of other first constellation points of the first set $\Omega_1$. The second preferred point P(1) is exemplified to be a corresponding first constellation point of a location 406, its corresponding first candidate value is $u_1$, and its corresponding second candidate value is $v_3$. Next, a pointer t is used to point to the second candidate value $v_3$. Then, one first constellation point, which corresponds to the second candidate value $v_3$ and a subsequent first candidate value $u_2$ of the first candidate value $u_1$, is collected into the first set $\Omega_1$, which can be referred to as the corresponding first constellation of a location 404. After repeating the above steps, 10 preferred points P(1) of the first detection layer can be obtained, respectively, by way of linking-list schemes. The 10 preferred points P(1) are assumed as A1, B1, . . . , and J1.

Figure 5:
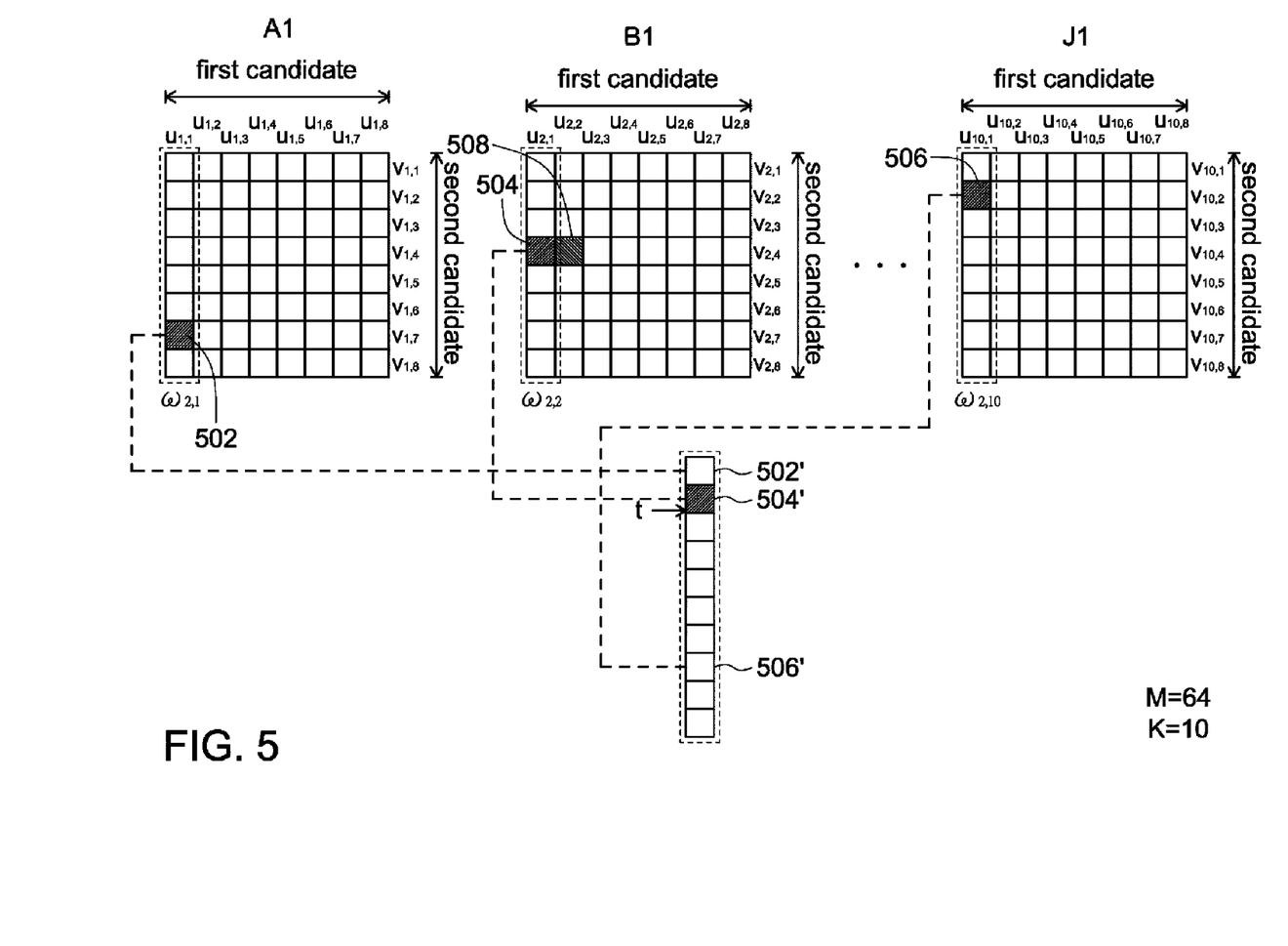
FIG. 5 shows a schematic illustration of another example of the first candidate values and second candidate values corresponding to the second detection layer according to the first embodiment of the invention.

The 10 preferred points P(1) are transferred to the second detection layer. FIG. 5 is a schematic illustration of another example of the first candidate values and second candidate values corresponding to the second detection layer according to the first embodiment of the invention. In FIG. 5, the 10 preferred points P(1) A1, B1, . . . , and J1 are received from the first detection layer. Respectively, let $x_T$ be A1, B1, . . . , and J1 to be substituted into $y_{T-1} = r_{(T-1)T}x_T + r_{(T-1)(T-1)}x_{T-1}$ to obtain 10 second zero-forcing soft-output solutions of $x_{T-1}$ in the second detection layer. After that, 8 first candidate values and 8 second candidate values for each of the 10 second zero-forcing soft-output solutions of $x_{T-1}$ are obtained based on the SE enumeration rule. In this example, based on the SE enumeration rule, the enumerated 8 first candidate values are regarded as $1^{st}$-$1^{st}$ candidate values to $8^{th}$-$1^{st}$ candidate values. Next, multiple second constellation points, which correspond to the 10 $1^{st}$-$1^{st}$ candidate values $u_{1,1}$~$u_{10,1}$ and multiple second candidate values, are selected as 10 second sub-sets $\omega_{2,1}$~$\omega_{2,10}$, respectively. Then, one respective second constellation point with a less PED is obtained from the second constellation points of every second sub-sets $\omega_{2,1}$~$\omega_{2,10}$, so as to obtain the second set $\Omega_2$.

In FIG. 5, corresponding to the preferred point A1, the second constellation point with a less PED is selected from the 8 second constellation points corresponding to the $1^{st}$-$1^{st}$ candidate $u_{1,1}$ and the second candidate values $v_{1,1}$~$v_{1,8}$ in the second set $\Omega_2$, such as the corresponding second constellation point of a location 502. Then, the selected second constellation point is collected into the second set $\Omega_2$ and positioned at a location 502'. In calculating PEDs, let $x_{T-1}$ be the values of all second constellation points of the second sub-set $\omega_{2,1}$ for respectively substituting into $r_{(T-1)T}x_T + r_{(T-1)(T-1)}x_{T-1}$, and the obtained results are defined to be $y'_{T-1}$. After that, by using $y'_T(=r_{TT}x_T)$ obtained at $x_T=A1$, calculate the square root of $(y'_T-y_T)^2+(y'_{T-1}-y_{T-1})^2$. The calculation result is the corresponding PED of each second constellation points of the second sub-set $\omega_{2,1}$.

Corresponding to the preferred point B1, the selected is the second constellation point with the least PED is selected from the 8 second constellation points corresponding to the $1^{st}$-$1^{st}$ candidate $u_{2,1}$ and the second candidate values $v_{2,1}$~$v_{2,8}$ in the second sub-set $\omega_{2,2}$, such as the corresponding second constellation point of a location 504. Then, the selected second constellation point is collected into the second set $\Omega_2$ and positioned at a location 504'. Analytically, corresponding to the preferred point J1, the second constellation point with the least PED is selected from the 8 second constellation points corresponding to the $1^{st}$-$1^{st}$ candidate $u_{10,1}$ and the second candidate values $v_{10,1}$~$v_{10,8}$ in the second sub-set $\omega_{2,10}$, such as the corresponding second constellation point of a location 506. Then, the selected second constellation point is collected into the second set $\Omega_2$ and positioned at a location 506'.

A preferred point P(2) with the least PED is selected From the 8 second constellation points of the second set $\Omega_2$. That is, the PED corresponding to the preferred point P(2) is less than the PED corresponding to any of other second constellation points of the second set $\Omega_2$. As for the selected first preferred point P(2), it is exemplified to be, the corresponding second constellation point of the location 504'; it is originated from the second sub-set $\omega_{2,2}$; its corresponding first candidate value is $u_{2,1}$; and its corresponding second candidate value is $v_{2,4}$. Next, a pointer t is used to point to the second candidate value $v_{2,4}$. Then, one second constellation point, which corresponds to the second candidate value $v_{2,4}$ and a subsequent first candidate value $u_{2,2}$ of the first candidate value $u_{2,1}$, is collected into the second sub-set $\omega_{2,2}$, which can be referred to as the corresponding second constellation of a location 508. After that, the one with the least PED is obtained from the second constellation points of the second sub-set $\omega_{2,2}$, and is collected into the second sub-set $\omega_{2,2}$. After repeating the above steps, 10 preferred points P(2) of the second detection layer can be obtained, respectively, by way of linking-list schemes.

If n is less than or equal to (T−2), the value of n is added by 1. Consequently, the derivation is analytical. That is, corresponding to the $n^{th}$ detection layer, 10 preferred points P(n−1)A(n−1), B(n−1), ..., and J(n−1) are received from the $(n-1)^{th}$ detection layer; and 10 $n^{th}$ zero-forcing soft-output solutions of $x_{T-n+1}$ corresponding to the $n^{th}$ detection layer are obtained. Based on the SE enumeration rule, 8 first candidate values and 8 second candidate values for each of the $n^{th}$ zero-forcing soft-output solutions are obtained. In this example, based on the SE enumeration rule, the enumerated 8 first candidate values are regarded as $1^{st}$-$1^{st}$ candidate values to $8^{th}$-$1^{st}$ candidate values. Next, multiple $n^{th}$ constellation points, which correspond to the 10 $1^{st}$-$1^{st}$ candidate values $u_{1,1}$~$u_{10,1}$ and multiple second candidate values, are selected as 10 $n^{th}$ sub-sets $\omega_{n,1}$~$\omega_{n,10}$, respectively. Then, one respective $n^{th}$ constellation point with the least PED is obtained from the $n^{th}$ constellation points of every $n^{th}$ sub-sets $\omega_{n,1}$~$\omega_{n,10}$, so as to obtain the $n^{th}$ set $\Omega_n$.

An $i^{th}$ preferred point P(n) is selected from the $n^{th}$ set $\Omega_n$, wherein the PED corresponding to the $i^{th}$ preferred point P(n) is less than the PED corresponding to any of other $n^{th}$ constellation points of the $n^{th}$ set $\Omega_n$. Next, according to the corresponding $n^{th}$ sub-set of the $i^{th}$ preferred point P(n), one $n^{th}$ constellation point, which corresponds to a subsequent first candidate value of a corresponding first candidate value of the $i^{th}$ preferred point P(n) and a corresponding second candidate value of the $i^{th}$ preferred point P(n), is collected into the corresponding $n^{th}$ sub-set of the $i^{th}$ preferred point P(n). After that, those with less PEDs are obtained from the $n^{th}$ constellation points of the $n^{th}$ sub-set, and collected into the $n^{th}$ set $\Omega_n$. In this example, i is a positive integer from 1 to 10. Consequently, the first to $10^{th}$ preferred points P(n) can be generated by way of linking-list schemes. The 10 preferred points P(T−1) of the $(T-1)^{th}$ detection layer are transferred to the $T^{th}$ detection layer.

Figure 6:
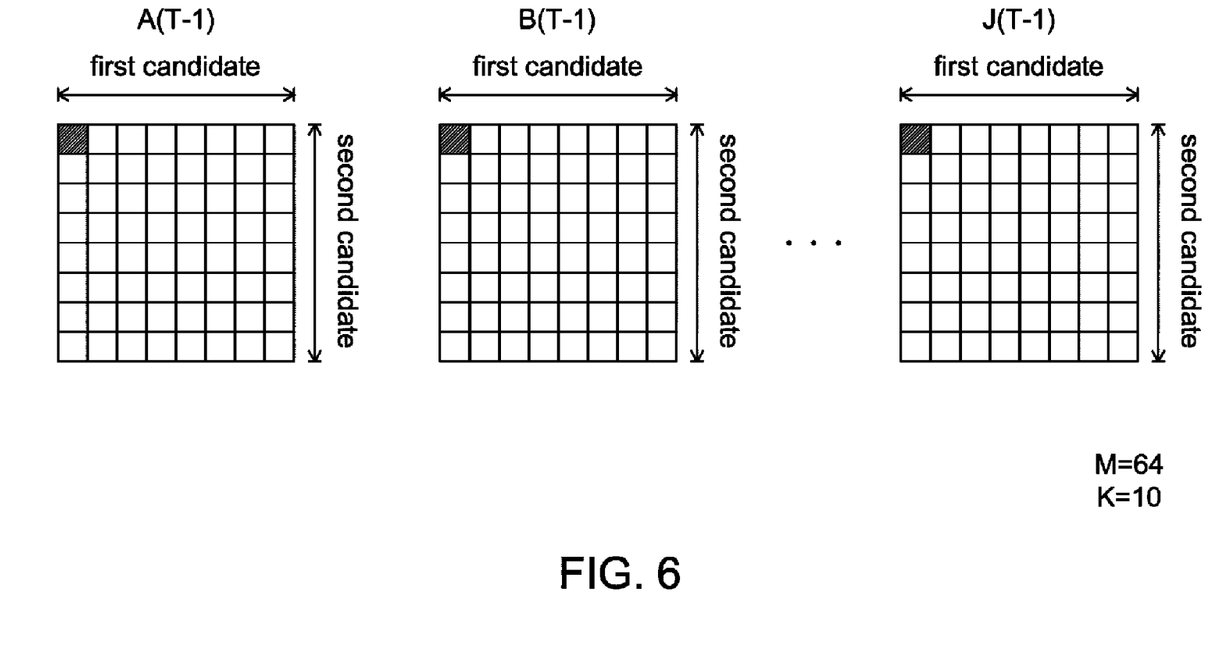
FIG. 6 shows a schematic illustration of an example of the first candidate values and second candidate values corresponding to $T^{th}$ detection layer according to the first embodiment of the invention.

FIG. 6 is a schematic illustration of an example of the first candidate values and second candidate values corresponding to $T^{th}$ detection layer according to the first embodiment of the invention. Referring to FIG. 6, the preferred points P(T−1) of the $(T-1)^{th}$ detection layer are received and substituted into $y_1 = r_{1T}x_T + \ldots + r_{11}x_1$ to obtain 10 $T^{th}$ zero-forcing soft-output solutions of $x_1$ corresponding to the $T^{th}$ detection layer. A first candidate value and a second candidate value for each of the 10 $T^{th}$ zero-forcing soft-output solutions of $x_1$ are obtained based on the SE enumeration rule. The first candidate values and second candidate values are corresponding to 10 $T^{th}$ constellation points, which are referred to as the 10 preferred points P(T) of the $T^{th}$ detection layer. One of the 10 preferred points P(T), which has the least PED, is served as the optimal solution corresponding to the T signals.

In the sphere decoding method applied to a MIMO channel disclosed in the embodiment of the invention, K preferred points are obtained from a part of constellation points of every detection layers by way of linking-list schemes based on the SE enumeration rule in the complex domain. In this regard, an optimal solution of T signals can be obtained by merely calculating the PEDs of a part of constellation points without having to calculate the PEDs of all the constellation points, thereby greatly reducing the detection complexity of the sphere decoding method and computation time. Therefore, the values of the T signals outputted by T transmission antennas of a transmitting end can be quickly solved according to the R reception signals received by R reception antennas of a receiving end. Therefore, the receiving end using the sphere decoding method applied to a MIMO channel of the embodiment can have advantages of high-performance signal transmission and decoding and reducing system hardware complexity and chip area.

Embodiment Two

The sphere decoding method applied to a MIMO channel of this embodiment is applied in the real domain, which includes the following steps of: a. receiving T signals transmitted via a MIMO channel, wherein T is a positive integer, and the MIMO channel is characterized by a channel matrix; b expanding the channel matrix in a real form and generating a corresponding triangle matrix, wherein the triangle matrix corresponds to a first detection layer to a $2T^{th}$ detection layer, each detection layers includes M constellation points, and M is a positive integer; c. obtaining a first zero-forcing soft-output solution corresponding to the first detection layer, and obtaining K preferred points P(1) of the first detection layer based on the SE enumeration rule, wherein K is a positive integer less than or equal to M; d obtaining K $n^{th}$ zero-forcing soft-output solutions corresponding to an $n^{th}$ detection layer according to K preferred points P(1) of an $(n-1)^{th}$ detection layer; obtaining an $n^{th}$ set based on the SE enumeration rule, wherein the $n^{th}$ set contains multiple $n^{th}$ constellation points of the $n^{th}$ detection layer; selecting an $i^{th}$ preferred point P(n) from the $n^{th}$ set; collecting another $n^{th}$ constellation point, not included in the first set, into the $n^{th}$ set according to the $i^{th}$ preferred point P(n), wherein i is a positive integer from 1 to K, and n is a positive integer from 2 to (2T−1); and e. obtaining K $2T^{th}$ zero-forcing soft-output solutions corresponding to a $2T^{th}$ detection layer according to K preferred points P(2T−1) of the $(2T-1)^{th}$ detection layer; obtaining K preferred points P(2T) of the $2T^{th}$ detection layer based on the SE enumeration rule; and determining an optimal solution corresponding to the T signals according to one of the K preferred points P(2T) which corresponds to the least PED.

Figure 7:
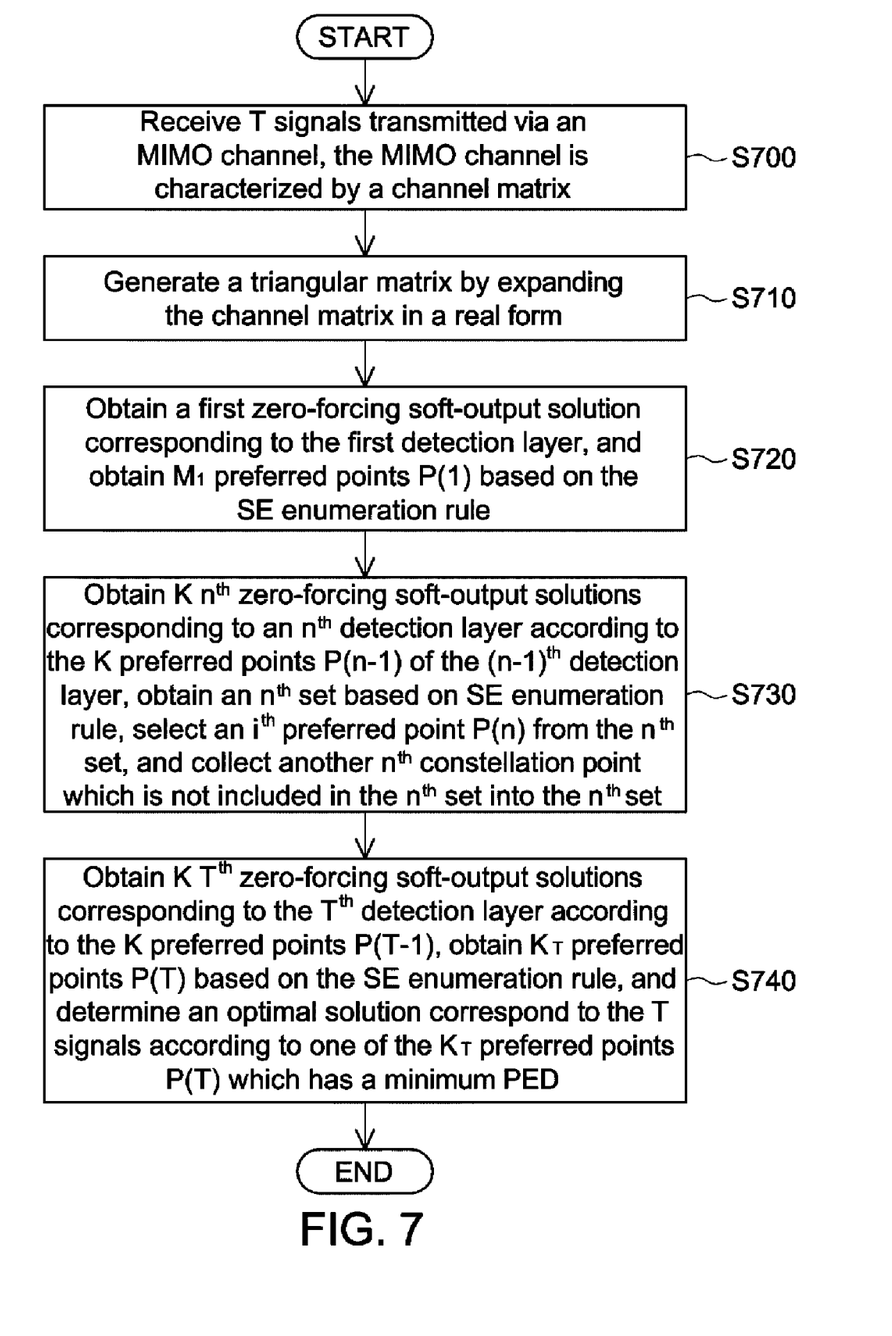
FIG. 7 shows a flowchart of a sphere decoding method applied to a MIMO channel according to a second embodiment of the invention.

Further detailed description is provided below. FIG. 7 is a flowchart of a sphere decoding method applied to a MIMO channel according to a second embodiment of the invention. First, in step S700, receive T signals transmitted via the MIMO channel. The MIMO channel is characterized by a channel matrix. Preferably, R' reception antennas are used to receive T signals transmitted by T transmitter antennas via the MIMO channel, wherein R' is a positive integer. The channel matrix is an R'×T channel matrix H. The MIMO system represented in time domain or frequency domain can be defined as the equality formula (1):

$$r = Hx + n$$

wherein, the R'×1 matrix r represents the signals received by R' reception antennas, the T×1 matrix x represents the signals transmitted by T transmission antennas, and the R'×1 matrix n represents noise.

Next, in step S710, the channel matrix H is expanded in a real form, and a QR decomposition is performed on the channel matrix H expanded in the real form to generate a triangular matrix, wherein the triangular matrix corresponds to a first detection layer to a $2T^{th}$ detection layer. Preferably, the first to $2T^{th}$ detection layers correspond to rows of the triangular matrix having the most "0" elements, the secondly most "0" elements, . . . , the least "0" elements. In the step S710, the equality formula (1) of MIMO system can be transformed substantially transferred as follows:

$$r_R = H_R x_R + n_R \tag{4}$$

wherein, $$r_R = \begin{vmatrix} \mathrm{Re}(r) \\ \mathrm{Im}(r) \end{vmatrix},$$

$$x_R = \begin{vmatrix} \mathrm{Re}(x) \\ \mathrm{Im}(x) \end{vmatrix},$$

$$n_R = \begin{vmatrix} \mathrm{Re}(n) \\ \mathrm{Im}(n) \end{vmatrix},$$

$$H_R = \begin{bmatrix} \mathrm{Re}(H) & -\mathrm{Im}(H) \\ \mathrm{Im}(H) & \mathrm{Re}(H) \end{bmatrix}.$$

Besides, by performing the above-mentioned QR decomposition, it can be obtained:

$$H_R = Q_R R_R$$

wherein, $Q_R$ is a 2R'×2T matrix, and $R_R$ is a 2T×2T triangular matrix. The triangular matrix $R_R$ is an upper triangular matrix for instance, but is not limited thereto. After the step S710, according to equality formula (4), another equality formula of the MIMO system can be obtained as follows:

$$y_R = Q_R^T r_R = R_R x_R + Q^T n_R \tag{5}$$

wherein, the matrix product of $Q^T$ and Q is an unit matrix I. If the noise item $Q^T n_R$ in equality formula (5) is omitted, and the triangular matrix R is an upper triangular matrix, the equality formula (5) can be expanded in a matrix form as follows:

$$\begin{bmatrix} \tilde{y}_1 \\ \tilde{y}_2 \\ \tilde{y}_3 \\ \vdots \\ \tilde{y}_{2T} \end{bmatrix} = \begin{bmatrix} \tilde{r}_{11} & \tilde{r}_{12} & \tilde{r}_{13} & \cdots & \widetilde{r_{1(2T)}} \\ 0 & \tilde{r}_{22} & \tilde{r}_{23} & \ddots & \widetilde{r_{2(2T)}} \\ 0 & 0 & \tilde{r}_{33} & \ddots & \widetilde{r_{3(2T)}} \\ \vdots & \vdots & \ddots & \ddots & \vdots \\ 0 & 0 & 0 & 0 & \widetilde{r_{(2T)(2T)}} \end{bmatrix} \begin{bmatrix} \tilde{x}_1 \\ \tilde{x}_2 \\ \tilde{x}_3 \\ \vdots \\ \tilde{x}_{2T} \end{bmatrix} \tag{6}$$

wherein $\tilde{y}_{\tilde{p}}$ and $\tilde{r}_{\tilde{p}\tilde{q}}$ are given, p is a positive integer from 1 to 2T, and q is a positive integer from 1 to 2T. This embodiment finds the optimal solution of $\tilde{x}_{\tilde{1}}$ to $\tilde{x}_{\widetilde{2T}}$ by using the values of given $y_p$ and $y_{pq}$.

In equality formula (6), the equation $\tilde{y}_{\widetilde{2T}} = \widetilde{r_{(2T)(2T)}} \tilde{x}_{\widetilde{2T}}$ corresponding to $\tilde{x}_{\widetilde{2T}}$ is defined as the first detection layer; the equation $\widetilde{y_{2T-1}} = \widetilde{r_{(2T-1)(2T)}} \tilde{x}_{\widetilde{2T}} + \widetilde{r_{(2T-1)(2T-1)}} \widetilde{x_{2T-1}}$ corresponding to $\widetilde{x_{2T-1}}$ is defined as the second detection layer; the equations corresponding to $\widetilde{x_{2T-2}}$, . . . , $\tilde{x}_{\tilde{2}}$ are defined as the third to $(2T-1)^{th}$ detection layers; and the equation $\tilde{y}_{\tilde{1}} = \widetilde{r_{(1)(2T)}} \tilde{x}_{\widetilde{2T}} + \ldots + \tilde{r}_{11} \tilde{x}_{\tilde{1}}$ corresponding to $\tilde{x}_{\tilde{1}}$ is defined as the $2T^{th}$ detection layer, wherein each detection layer includes $\sqrt{M}$ constellation points and $\sqrt{M}$ is a positive integer. The K-Best sphere decoding method generates K preferred points corresponding to each detection layer, wherein K is less than $\sqrt{M}$. The embodiment of this invention, however, is not limited thereto the exemplary example, in which the sphere decoding method generates K preferred points for each detection layers. In practice, the sphere decoding method can generate different numbers of preferred points for each detection layers.

Then, in step S720, a first zero-forcing soft-output solution corresponding to the value $\tilde{x}_{\widetilde{2T}}$ of the first detection layer is obtained and K preferred points P(1) of the first detection layer are obtained based on the SE enumeration rule. Corresponding to the first detection layer, the equation $\tilde{y}_{\widetilde{2T}} = \widetilde{r_{(2T)(2T)}} \tilde{x}_{\widetilde{2T}}$ is solved to obtain the first zero-forcing soft-output solution $\tilde{y}_{\widetilde{2T}} / \widetilde{r_{(2T)(2T)}}$ of $\tilde{x}_{\widetilde{2T}}$, and the first zero-forcing soft-output solution of $\tilde{x}_{\widetilde{2T}}$ could be represented by floating-point numbers. The above SE enumeration rule enumerates $K_1$ integers near the first zero-forcing soft-output solution of $\tilde{x}_{2\tilde{T}}$ in an ascending order according to a one-dimensional distance from the first zero-forcing soft-output solution of $\tilde{x}_{2\tilde{T}}$. The enumerated K integers are served as the K preferred points P(1). Any of the PEDs corresponding to the K preferred points P(1) is less than the PED corresponding to any of other first constellation points. In this way, the K preferred points P(1) of the first detection layer can be obtained without having to substantially calculate any PED, thereby reducing the system complexity.

Then, this embodiment enters step S730. As for second to $(2T-1)^{th}$ detection layers, K $n^{th}$ zero-forcing soft-output solutions of $\widetilde{x_{2T-1}}$ are obtained according to K preferred points P(n-1) of the $(n-1)^{th}$ detection layer; and a $n^{th}$ set $\Omega_n$ is obtained based on the SE enumeration, wherein the $n^{th}$ set $\Omega_n$ contains multiple $n^{th}$ constellation points of the $n^{th}$ detection layer. Then, an $i^{th}$ preferred point P(n) is obtained from the $n^{th}$ set $\Omega_n$; and another $n^{th}$ constellation point, which is not included in the $n^{th}$ set $\Omega_n$, is collected into the $n^{th}$ set $\Omega_n$, wherein i is a positive integer from 1 to K, and n is a positive integer from 2 to (2T-1).

In the step S730, the second detection layer is first processed, and at this time n equals to 2. When n equals to 2, $\widetilde{y_{2T-1}} = \widetilde{r_{(2T-1)(2T)}}\tilde{x}_{2\tilde{T}} + \widetilde{r_{(2T-1)(2T-1)}}\widetilde{x_{2T-1}}$ is solved to obtain K second zero-forcing soft-output solutions of $\widetilde{x_{2T-1}}$ corresponding to the second detection layer according to K preferred points P(1) of the first detection layer. The K second zero-forcing soft-output solutions of $\widetilde{x_{2T-1}}$ are corresponding to K indexes, respectively. Next, $\sqrt{M}$ first candidate values for each of the K second zero-forcing soft-output solutions of $\widetilde{x_{2T-1}}$ are obtained based on the SE enumeration rule. In this example, based on the SE enumeration rule, the enumerated $\sqrt{M}$ first candidate values are regarded as $1^{st}$-$1^{st}$ to $\sqrt{M}^{th}$-$1^{st}$ candidate values. Next, multiple second constellation points, which correspond to the K $1^{st}$-$1^{st}$ candidate values, are selected as a second set $\Omega_2$.

Next, the second constellation points are set to be $\widetilde{x_{2T-1}}$, the second constellation points and the corresponding preferred points P(1) are substituted into $\widetilde{r_{(2T-1)(2T)}}\tilde{x}_{2\tilde{T}} + \widetilde{r_{(2T-1)(2T-1)}}\widetilde{x_{2T-1}}$, and the obtained results are defined to be $\widetilde{y'_{2T-1}}$. Therefore, the PED corresponding to each second constellation points corresponds to a corresponding square root of the corresponding $(\widetilde{y'_{2T}} - \tilde{y}_{2\tilde{T-1}})^2 + (\widetilde{y'_{2T-1}} - \widetilde{y_{2T-1}})^2$. Let the value of i be 1. Then, an $i^{th}$ preferred point P(2) is selected from the second set $\Omega_2$, wherein the PED corresponding to the $i^{th}$ preferred point P(2) is less than the PED corresponding to any of other second constellation points of the second set $\Omega_2$. Next, one second constellation point, which corresponds to a corresponding index of the $i^{th}$ preferred point P(2) and a subsequent first candidate value of a corresponding first candidate value of the $i^{th}$ preferred point P(1), is collected into the second set $\Omega_2$. When i is less than or equal to (K-1), the value of i is added by 1 and the above steps are repeated. Consequently, the first to $K^{th}$ preferred points P(2) can be generated by way of linking-list schemes.

If n is less than or equal to (2T-2), the value of n is added by 1. Then, the third to $(T-1)^{th}$ detection layers are processed, and at this time n equals to 3 to (T-1), respectively. First, $\widetilde{y_{2T-n+1}} = \widetilde{r_{(2T-n+1)(2T)}}\tilde{x}_{2\tilde{T}} + \ldots + \widetilde{r_{(2T-n+1)(2T-n+1)}}\widetilde{x_{2T-n+1}}$ is solved to obtain K $n^{th}$ zero-forcing soft-output solutions of $\widetilde{x_{2T-n+1}}$ corresponding to the $n^{th}$ detection layer according to K preferred points P(n-1) of the $(n-1)^{th}$ detection layer. Next, $\sqrt{M}$ first candidate values for each of the K $n^{th}$ zero-forcing soft-output solutions of $\widetilde{x_{2T-n+1}}$ are obtained based on the SE enumeration rule. Then, K $n^{th}$ constellation points, which correspond to the K $1^{st}$-$1^{st}$ candidate values, are selected as an $n^{th}$ set $\Omega_2$. In this way, each corresponding PEDs of the third constellation points corresponds to a square root of the corresponding $(\widetilde{y'_{2T}} - \tilde{y}_{2\tilde{T}})^2 + (\widetilde{y'_{2T-1}} - \widetilde{y_{2T-1}})^2 + \ldots + (\widetilde{y'_{2T-n+1}} - \widetilde{y_{2T-n+1}})^2$.

Let the value of i be 1. An $i^{th}$ preferred point P(n) is selected from the $n^{th}$ set $\Omega_n$, wherein the PED corresponding to the $i^{th}$ preferred point P(n) is less than the PED corresponding to any of other $n^{th}$ constellation points of the $n^{th}$ set $\Omega_n$. Next, one $n^{th}$ constellation point, which corresponds to a corresponding index of the $i^{th}$ preferred point P(n) and a subsequent first candidate value of a corresponding first candidate value of the $i^{th}$ preferred point P(n), is collected into the $n^{th}$ set $\Omega_n$. When i is less than or equal to (K-1), the value of i is added by 1 and the above steps are repeated. Consequently, the first to $K^{th}$ preferred points P(n) can be generated by way of linking-list schemes. In this way, the K preferred points P(n) of the $n^{th}$ detection layer can be obtained by using only (2K-1) times of PED calculation without having to calculate the PED up to KM times, thereby reducing the system complexity.

After that, in step S740, $\tilde{y}_1 = \widetilde{r_{(12T)}}\tilde{x}_{2\tilde{T}} + \ldots + \tilde{r}_{11}\tilde{x}_1$ is solved to obtain K $2T^{th}$ zero-forcing soft-output solutions of $\tilde{x}_1$ corresponding to the $2T^{th}$ detection layer according to K preferred points P(2T-1) of the $(2T-1)^{th}$ detection layer. Next, K preferred points P(2T) of the $2T^{th}$ detection layer are obtained based on the SE enumeration rule. Also, according to one of the K preferred points P(2T) which corresponds to the least PED, an optimal solution corresponding to the T signals is determined. The optimal solution is served as the optimal solution of the matrix $x_R$. In the K preferred points P(2T), each corresponding PEDs corresponds to a square root of the corresponding $(\widetilde{y'_{2T}} - \tilde{y}_{2\tilde{T}})^2 + (\widetilde{y'_{2T-1}} - \widetilde{y_{2T-1}})^2 + \ldots + (\tilde{y}^i_1 - \tilde{y}_1)^2$. In this way, the K preferred points P(2T) in the $2T^{th}$ detection layer can be obtained by using K times of PED calculation without having to calculate the PED up to M times, thereby reducing the system complexity.

Illustration will be made without any limitative purpose according to the example, in which M equals to 64 and K equals to 10. Corresponding to the first zero-forcing soft-output solution of $\tilde{x}_{2\tilde{T}}$, the 10 (K=10) preferred points P(1) of the first detection layer can be obtained based on the SE enumeration rule without having to calculate the PEDs, and the 10 preferred points P(1) are transferred to the second detection layer. Any of the PEDs corresponding to the 10 preferred points P(1) is less than the PED corresponding to any of other first constellation points.

Figure 8A:
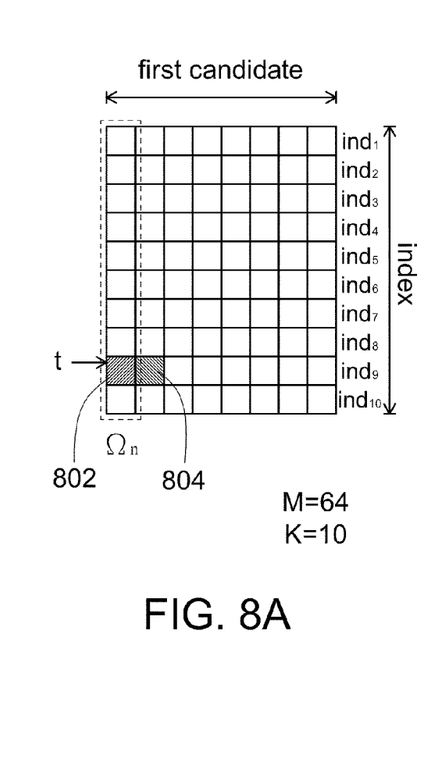
FIGS. 8A to 8C show schematic illustrations of an example of the indexes corresponding to the $n^{th}$ detection layer and the first candidate values according to the second embodiment of the invention.
Figure 8B:
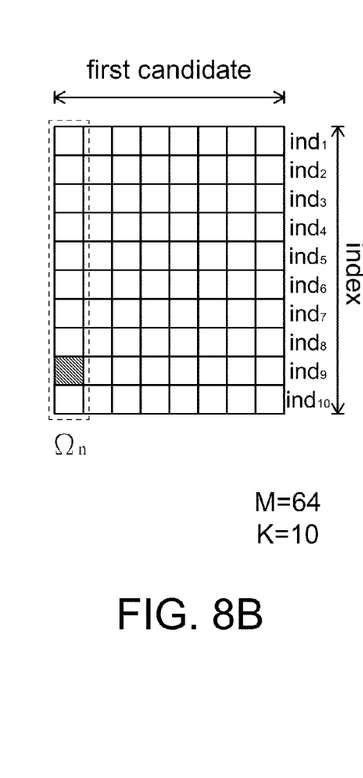
Figure 8C:
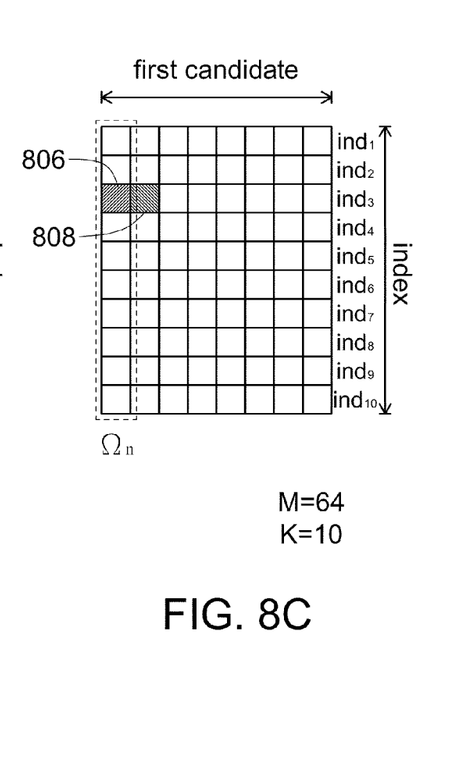

Refer to FIGS. 8A to 8C, which are schematic illustrations of an example of the indexes corresponding to the $n^{th}$ detection layer and the first candidate values according to the second embodiment of the invention. In FIG. 8A, the 10 preferred points P(n-1) are received from the $(n-1)^{th}$ detection layer, and are substituted into $\widetilde{y_{2T-n+1}} = \widetilde{r_{(2T-n+1)(2T)}}\tilde{x}_{2\tilde{T}} + \ldots + \widetilde{r_{(2T-n+1)(2T-n+1)}}\widetilde{x_{2T-n+1}}$ to obtain 10 $n^{th}$ zero-forcing soft-output solutions of $\widetilde{x_{2T-n+1}}$ corresponding to the $n^{th}$ detection layer. The 10 $n^{th}$ zero-forcing soft-output solutions of $\widetilde{x_{2T-n+1}}$ are corresponding to 10 indexes $ind_1$ to $ind_{10}$, respectively. Next, 8 first candidate values for each $n^{th}$ zero-forcing soft-output solutions of $\widetilde{x_{2T-n+1}}$ is obtained based on the SE enumeration. In this example, based on the SE enumeration rule, the enumerated 8 first candidate values are regarded as $1^{st}$-$1^{st}$ to $8^{th}$-$1^{st}$ candidate values. Next, 10 $n^{th}$ constellation points, which correspond to the $1^{st}$-$1^{st}$ candidate, are selected as the $n^{th}$ set $\Omega_n$. Each corresponding PEDs of the $n^{th}$ constellation points corresponds to a square root of the corresponding $(\widetilde{y'_{2T}}-\widetilde{\tilde{y}_{2\tilde{T}}})^2+(\widetilde{y'_{2T-1}}-\widetilde{y_{2T-1}})^2+\ldots+(\widetilde{y'_{2T-n+1}}-\widetilde{y_{2T-n+1}})^2$.

An first preferred point P(n) is selected from the 10 $n^{th}$ constellation points of the $n^{th}$ set $\Omega_n$, wherein the PED corresponding to the first preferred point P(n) is less than the PED corresponding to any of other $n^{th}$ constellation points of the $n^{th}$ set $\Omega_n$. The first preferred point P(n) is exemplified to be a corresponding $n^{th}$ constellation point of a location 802, its corresponding index is the index $ind_9$. Next, a pointer t is used to point to the index $ind_9$. Then, one $n^{th}$ constellation point, which corresponds to the index $ind_9$ and a subsequent first candidate value of a corresponding first candidate value of the first preferred point P(n), is collected into the $n^{th}$ set $\Omega_n$, which can be referred to as the result shown in FIG. 8B.

Moreover, a second preferred point P(n) is selected from the 8 $n^{th}$ constellation points of the $n^{th}$ set $\Omega_n$, wherein the PED corresponding to the second preferred point P(n) is less than the PED corresponding to any of other $n^{th}$ constellation points of the $n^{th}$ set $\Omega_n$. The second preferred point P(n) is exemplified to be a corresponding $n^{th}$ constellation point of a location 806, its corresponding index is the index $ind_3$. Next, a pointer t is used to point to the index $ind_3$, as shown in FIG. 8C. Then, one $n^{th}$ constellation point, which corresponds to the index $ind_3$ and a subsequent first candidate value of a corresponding first candidate value of the second preferred point P(n), is collected into the $n^{th}$ set $\Omega_n$, which can be referred to as a corresponding $n^{th}$ constellation point of a location 808. After repeating the above steps, 10 preferred points P(n) of the $n^{th}$ detection layer can be obtained, respectively, by way of linking-list schemes. In this example, 10 preferred points P(T2-1) are transferred to the $(2T-1)^{th}$ detection layer.

Figure 9:
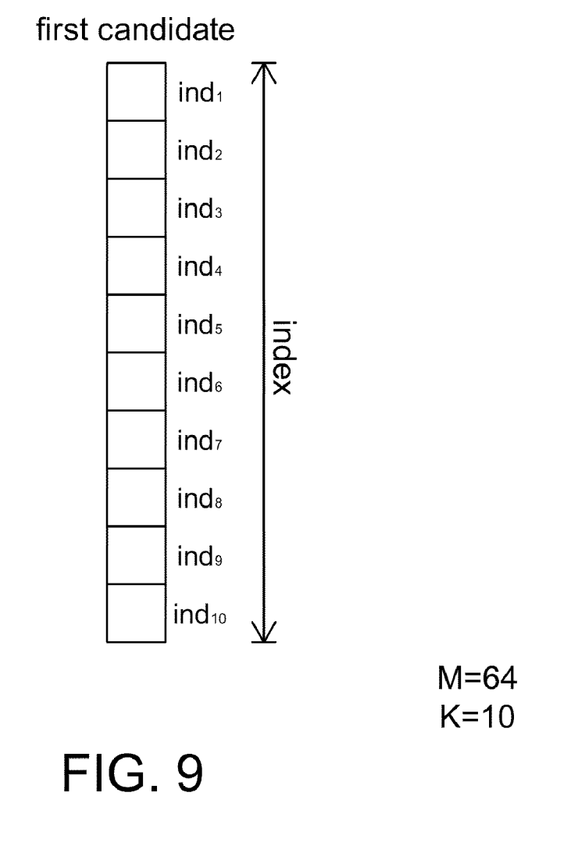
FIG. 9 shows a schematic illustration of an example of the indexes corresponding to the $2T^{th}$ detection layer and the first candidate values according to the second embodiment of the invention.

FIG. 9 is a schematic illustration of an example of the indexes corresponding to the $2T^{th}$ detection layer and the first candidate values according to the second embodiment of the invention. In FIG. 9, the 10 preferred points P(2T-1) are received from the $(2T-1)^{th}$ detection layer, and are substituted into $\tilde{y}_{\tilde{1}}=\widetilde{r_{(2T)}}\tilde{x}_{\tilde{2}\tilde{T}}+\ldots+\tilde{r}_{\tilde{1}\tilde{1}}\tilde{r}_{\tilde{1}}$ to obtain 10 $2T^{th}$ zero-forcing soft-output solutions of $\tilde{x}_{\tilde{1}}$ corresponding to the $2T^{th}$ detection layer. Each $n^{th}$ zero-forcing soft-output solutions of $\widetilde{x_{2T_{n1}}}$ is corresponding to a respective index. Next, one first candidate value for each of the $n^{th}$ zero-forcing soft-output solutions of $\widetilde{x_{2T_{n1}}}$ is obtained based on the SE enumeration rule. These first candidate values are corresponding to 10 $2T^{th}$ constellation points. The 10 $2T^{th}$ constellation points are regarded as 10 preferred points P(2T) of the $2T^{th}$ detection layer. One of the 10 preferred points P(2T) which corresponds to the least PED is regarded as the optimal solution corresponding to the T signals.

In the sphere decoding method applied to a MIMO channel disclosed in the embodiment of the invention, K preferred points are obtained from a part of constellation points of every detection layers by way of linking-list schemes based on the SE enumeration rule in the real domain. In this regard, an optimal solution of T signals can be obtained by merely calculating the PEDs of a part of constellation points without having to calculate the PEDs of all the constellation points, thereby greatly reducing the detection complexity of the sphere decoding method and computation time. Therefore, the values of the T signals outputted by T transmission antennas of a transmitting end can be quickly solved according to the R reception signals received by R reception antennas of a receiving end. Therefore, the receiving end using the sphere decoding method applied to a MIMO channel of the embodiment can have advantages of high-performance signal transmission and decoding and reducing system hardware complexity and chip area.

The sphere decoding method applied to a MIMO channel disclosed by the above embodiments of the invention can obtain K preferred points for each detection layer by calculating the PEDs corresponding to a part of constellation points from M constellation points of each detection layer respectively in the complex domain and the real domain based on the SE enumeration rule. Consequently, the detection complexity of the sphere decoding method and the calculation time can be greatly reduced and the signal receiving performance of the system can be maintained.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sphere decoding method applied to a multi-input multi-output (MIMO) channel, comprising:
   enumerating a plurality of constellation points of an $n^{th}$ detection layer corresponding to a MIMO channel matrix based on an enumeration rule, and defining at least one $n^{th}$ sub-set of the $n^{th}$ detection layer;
   selecting a constellation point with the least partial Euclidean distance (PED) as a preferred point from the $n^{th}$ sub-set;
   selecting another constellation point of the $n^{th}$ detection layer, not included in the $n^{th}$ sub-set, to substitute for the preferred point as one element of the $n^{th}$ sub-set;
   updating, if other preferred points are needed to be obtained, the $n^{th}$ sub-set repeatedly according to the least PED; and
   determining an optimal solution according to $K_n$ preferred points of the $n^{th}$ detection layer, wherein $K_n$ is a positive integer, the method implemented by a processor on a chip to decode a signal provided over the MIMO channel.

2. The method according to claim 1, wherein the another enumerated constellation point of the enumeration rule, which is for substituting for the preferred point as one element of the $n^{th}$ sub-set, is the constellation point adjacent to the preferred point but not contained in the $n^{th}$ sub-set previously.

3. The method according to claim 2, wherein the MIMO channel matrix is a complex matrix, and the enumeration rule is for enumerating the constellation points of the $n^{th}$ detection layer along a real axis and an imaginary axis, respectively;
   wherein the preferred point and the another constellation point belong to the same one of the real axis or the imaginary axis.

4. The method according to claim 2, wherein,
   the MIMO channel matrix corresponds to first to $T^{th}$ detection layers, and the $n^{th}$ detection layer and $K_n$ correspond to at least one of $2^{nd}$ to $(T-1)^{th}$ detection layers and at least one of $K_2$ to $K_{(T-1)}$, respectively;
   the first detection layer transfers $K_1$ preferred points to the second detection layer, the second detection layer transfers $K_2$ preferred points to the third detection layer, ..., and the $(T-1)^{th}$ detection layer transfers $K_{(T-1)}$ preferred points to the $T^{th}$ detection layer;
   the $n^{th}$ detection layer obtains an enumeration status of the $K_{(n-1)}$ groups of constellation points based on the enumeration rule according to $K_{(n-1)}$ preferred points of the $(n-1)^{th}$ detection layer, wherein the enumeration status of every group of constellation points corresponds to one group of $n^{th}$ sub-set; and the $n^{th}$ detection layer obtains the number of the preferred points according to a predetermined number of preferred points of every groups of $n^{th}$ sub-set, and transfers the $k_n$ preferred points to an $(n+1)^{th}$ detection layer.

5. The method according to claim 4, wherein the predetermined number of preferred points of every groups of $n^{th}$ sub-set is determined by the characteristic of the MIMO channel matrix.

6. The method according to claim 4, wherein the first to $T^{th}$ detection layers correspond respectively, in a Q-R decomposition of the MIMO channel matrix, to rows of the triangular matrix having the most "0" elements, the secondly most "0" elements, . . . , the least "0" elements.

7. The method according to claim 4, wherein the optimal solution is one of the $K_T$ preferred points of the $T^{th}$ detection layer corresponding to the least PED.

8. The method according to claim 3, wherein, every detection layers has M constellation points, M is a positive integer, and as for every group of constellation points, the enumeration enumerates $\sqrt{M}$ constellation points along the same real axis, and $\sqrt{M}$ constellation points along the same imaginary axis.

9. The method according to claim 2, wherein the MIMO channel matrix is a real matrix, the enumeration rule is for enumerating the constellation points of the $n^{th}$ detection layer along a single axis, and the preferred point and the another constellation point are adjacent along the single axis.

10. The method according to claim 9, wherein, the MIMO channel matrix corresponds to first to $2T^{th}$ detection layers, and the $n^{th}$ detection layer and $K_n$ correspond to at least one of the second to $(2T-1)^{th}$ detection layers and at least one of $K_2$ to $K_{(2T-1)}$, respectively;

the first detection layer transfers $K_1$ preferred points to the second detection layer, the second detection layer transfers $K_2$ preferred points to the third detection layer, . . . , and the $(2T-1)^{th}$ detection layer transfers $K_{(2T-1)}$ preferred points to the $2T^{th}$ detection layer;

the $n^{th}$ detection layer obtains an enumeration status of $K_{(n-1)}$ groups of constellation points based on the enumeration rule according to the $K_{(n-1)}$ preferred points of an $(n-1)^{th}$ detection layer, wherein an enumeration status of $K_{(n-1)}$ groups of constellation points corresponds to one group of $n^{th}$ sub-set; and the $n^{th}$ detection layer obtains $K_n$ preferred points from the one group of $n^{th}$ sub-set, and transfers the $k_n$ preferred points to an $(n+1)^{th}$ detection layer.

11. The method according to claim 10, wherein the first to $2T^{th}$ detection layers correspond respectively, in a Q-R decomposition of the MIMO channel matrix, to rows of a triangular matrix having the most "0" elements, the secondly most "0" elements, . . . , the least "0" elements.

12. The method according to claim 10, wherein $K_1$ preferred points of the first detection layer are determined from $K_1$ solutions which are around one solution with the least PED of the first detection layer.

13. The method according to claim 10, wherein the optimal solution is one of the $K_{2T}$ preferred points of the $2T^{th}$ detection layer corresponding to the least PED.

14. The method according to claim 10, wherein, every detection layers has $\sqrt{M}$ constellation points, $\sqrt{M}$ is a positive integer, and as for every group of constellation points, the enumeration rule enumerates $\sqrt{M}$ constellation points along the single axis; and the $n^{th}$ detection layer enumerates the $K_{(n-1)}$ groups of $\sqrt{M}$ constellation points along the single axis according to the $K_{(n-1)}$ preferred points of the $(n-1)^{th}$ detection layer.

15. The method according to claim 9, wherein the single axis corresponds to one of a real axis and an imaginary axis.

16. The method according to claim 1, wherein the enumeration rule is Schnorr & Euchner (SE) enumeration rule.

17. The method according to claim 1, wherein the number $K_n$ of the preferred points of the $n^{th}$ detection layer is determined by the characteristic of the MIMO channel matrix.

* * * * *